United States Patent
Ivanov

(10) Patent No.: US 8,910,267 B2
(45) Date of Patent: Dec. 9, 2014

(54) METHOD FOR MANAGING CONNECTIONS IN FIREWALLS

(71) Applicant: Joint Stock Company "InfoTeCS", Moscow (RU)

(72) Inventor: Alexandr Vyacheslavovich Ivanov, g. Krasnogorsk (RU)

(73) Assignee: Joint Stock Company "InfoTeCS", Moscow (RU)

( * ) Notice: Subject to any disclaimer, the term of this patent is extended or adjusted under 35 U.S.C. 154(b) by 0 days.

(21) Appl. No.: 13/938,578

(22) Filed: Jul. 10, 2013

(65) Prior Publication Data

US 2014/0115686 A1    Apr. 24, 2014

(30) Foreign Application Priority Data

Oct. 24, 2012   (RU) .................................. 2012145170

(51) Int. Cl.
*H04L 29/06*          (2006.01)
(52) U.S. Cl.
CPC ................ *H04L 63/02* (2013.01); *H04L 29/06* (2013.01)
USPC .......................................................... 726/11
(58) Field of Classification Search
CPC ........................................................ H04L 63/02
USPC ............................................................. 726/11
See application file for complete search history.

(56) References Cited

U.S. PATENT DOCUMENTS

| 2004/0044771 A1* | 3/2004 | Allred et al. | 709/227 |
| 2011/0055376 A1* | 3/2011 | Little | 709/224 |

* cited by examiner

*Primary Examiner* — Peter Shaw
(74) *Attorney, Agent, or Firm* — Honigman Miller Schwartz and Cohn LLP

(57) ABSTRACT

The disclosure relates to a method for managing connections in a firewall. The method includes receiving packets from an external network; generating a connection table; determining the total number of currently established connections; determining a level of firewall load by comparing the number of established connections with a threshold; identifying new and established connections based on two-way exchange of packets between a client and server; identifying closed connections based on processing ICMP error messages or flags in a TCP header; and dynamically determining current timeout values for connections from the network protocol type, the connection state, and the firewall load level. The method also includes modifying the last packet processing timestamp if any packet is passed within a given connection or a group of connections; and removing the connection if the last packet processing timestamp differs from the current time by a value greater than the timeout of said connection.

1 Claim, No Drawings

METHOD FOR MANAGING CONNECTIONS IN FIREWALLS

TECHNICAL FIELD

The disclosure relates to computer engineering, in particular, to methods for managing connections in firewalls that are used in communication networks.

BACKGROUND

To provide security in modern data networks, special means, such as firewalls, are often used to separate network areas from other areas and backbone lines. Most firewalls implement connection tracking mechanisms that allow stateful inspection and thereby increase the level of network security. Since storage of information about established connections consumes resources of the firewall, it is necessary to restrict the number of concurrent connections and remove unused connections.

This object becomes particularly significant when the load on the firewall increases.

Various methods are used to maintain stability and maximum throughput in network devices at high loads and overload.

For example, in high load casese network routers can apply methods of adjusting the input queue size (the RED/WRED algorithm) and/or blocking packets when the input buffer overflows (the Leaky bucket algorithm) (See Semenov Y. A. Telecommunications Technologies (v3.28, 20.08.2012), online version at http://book.itep.ru/; Stepanov S. N. Fundamentals of Telecommunications Traffic of Multiservice Networks, M., Eco-Trendz, 2010). Despite the fact that these mechanisms cope rather efficiently with network overloads, they have several drawbacks due to the field of their application. Since the routers operate on the OSI network layer, they are guided exclusively by the IP-header without analysis of the connection state. Thus, in the case of overload the network router will drop packets belonging to already established connections, equally with new connection requests, thereby breaking the established connections, which is, in particular, also the purpose of Denial-of-Service attacks (DoS/DDoS attacks).

There is also the known method for managing the state of connections in a network device which operates as a firewall and comprises:
 a processor;
 a memory unit;
 a network interface unit adapted to receive data packets from an external data network and send packets to an internal network, and
  supporting units (See U.S. Pat. No. 7,831,822).
  The method comprises the steps of
  receiving packets from the external network;
  generating a connection table containing the following information:
  a network protocol type;
  a connection state;
  a timestamp of processing of the last packet;
  determining the total number of currently established connections;
  analyzing data for each connection present in the connection table;
  removing the connection, if the last packet processing timestamp in the connection exceeds a predetermined threshold value.

The method steps are directly implemented in software installed in the firewall.

The main mechanism of clearing the table is to remove obsolete connections which are identified by comparing the last packet processing timestamp against a predetermined timeout threshold ("timeout" is understood as the time of waiting for packets in a connection before the connection is closed). If the connection table is filled, before adding a new connection obsolete connections are searched for and removed by the LRU-algorithm (Least Recently Used). This mechanism of removing obsolete connections does not work properly at high firewall loads, because every new connection will require to clear the filled table and invoke the LRU-algorithm. The operation of searching for obsolete connections consumes significant resources, therefore, referring to said operation for every new packet may exhaust processor resources and slow down processing of overall traffic. On the other hand, additional delays in the traffic processing may cause overflow of the input packet buffer and result in the loss of pending packets. Since the lost packets may relate to both new and already established connections, this will interrupt traffic exchange within the established connections. The low efficiency and interruption of established connections under high loads is the main disadvantage of the known method.

In order to search the connection table, the known method further uses hash values calculated from the packet data (a source address, a destination address, a source port, and a destination port). The same hash value is implied to be generated for the original packet (client-to-server packet) and for the reply packet due to swapping the source and destination addresses when the hash value is generated for the reply packet. The known method does not take into account the ability of modifying the packet by Network Address Translation (NAT), which narrows the scope of its applicability.

Furthermore, said known method does not take into account groups of logically related connections. For example, when an ICMP error message is passed, the related connection should be closed. In some protocols, such as FTP, additional connections can be established for transmission, and lifetime is to be controlled for the entire group of connections, rather than for individual connections. These restrictions also constitute disadvantages of the known method.

SUMMARY

The object of the present method is to resolve the problem of clearing the connection table in a firewall, in particular, under high loads.

The advantages of the present disclosure include: stable and reliable processing of established network connections, regardless of load on the firewall, and
 maximum throughput under the increased firewall load.
 The additional advantages are:
 the improved firewall resistance against DoS/DDoS-attacks;
 the capability of managing connections with address translation;
 the capability of managing a group of logically related connections for application network protocols.

To this end, a method is provided for managing connections in a firewall, the method comprising the steps of:
 receiving packets from an external network;
 generating a connection table containing the following information:
 information about packets included by a connection (an original packet, a reply packet, ICMP errors);

information about transformations of a packet in the case of address translation;
a network protocol type;
a connection state (new, established, closed);
a timestamp of processing of the last packet;
information about groups of connections in the case of application layer protocols (FTP, SIP);
determining the total number of currently established connections;
determining a level of firewall load by comparing the number of established connections with a predetermined threshold;
identifying new and established connections based on two-way exchange of packets between a client and a server;
identifying closed connections based on processing ICMP error messages or flags in a TCP header (for TCP only);
dynamically determining current timeout values for connections from the following parameters:
the network protocol type;
the connection state;
the firewall load level;
modifying the last packet processing timestamp, if any packet is passed within a given connection or a group of connections;
removing the connection, if the last packet processing timestamp differs from the current time by a value greater than the timeout of the connection.

Thus, the method according to the present disclosure dynamically modifies timeouts of connections as the firewall load changes. As the load increases, the current timeout values are reduced, which increases the firewall throughput.

Unlike the known method, the table is cleared from obsolete connections periodically, rather than when every new packet is processed, thus, consumption of the processor resources for removal of obsolete connections will be uniform and independent of the firewall load.

Established connections have priority over new connections, therefore, when the connection table is filled, new connection requests will be blocked, while processing of traffic within the already established connections will not be disturbed.

The connection stateful processing/inspection enables to increase resistance of the firewall against DoS/DDoS attacks. In particular, the usage of "three-way handshake" principles for all protocols (by analogy with establishing connections in TCP) can significantly reduce the probability of UDP-flood attacks, since all connections, in which the two-way exchange of packets has not been carried out, are considered to be new and removed first of all.

EMBODIMENTS OF THE DISCLOSURE

Let us consider an embodiment of the present method in a firewall that connects an external network (e.g. Internet) and an internal enterprise data communication network.
The firewall comprises the following elements:
a processor;
a memory module (RAM and ROM);
a network interface unit that enables to receive data packets from the external network and send packets to the internal network and in the reverse direction.
The firewall operates under control of a general-purpose operating system (e.g. Linux Ubuntu 9.10) and software (SW) which implements the required functions of the firewall.
In description of the algorithm, the term "client" refers to a node initiating a connection, and the term "server" refers to a node receiving the connection. "Source packet" refers to a packet sent from the client to the server, "reply packet" refers to a packet returned from the server to the client.

The software implements:
a packet filtering subsystem;
a connection processing subsystem;
an application layer protocol processing subsystem.

Before starting operation of the firewall, a user (or a system administrator) can specify network packet processing rules (filters) in the packet filtering subsystem for a specific configuration of the internal network. The administrator can also specify in the connection processing subsystem the following values:
a maximum number of established connections (MaxConnection);
a maximum timeout value for new and closed connections (TimeoutNewOrClosed);
a maximum timeout value for UDP connections (TimeoutUdp);
a maximum timeout value for TCP connections (TimeoutTcp);
a maximum timeout value for other connections (TimeoutIpOther);
a frequency of clearing obsolete connections (TimeoutCleanup).

The functions of the packet filtering subsystem include:
blocking a packet in accordance with configured network filters;
modifying a packet according to configured translation rules;
forwarding a packet to the connection processing subsystem (if the packet has passed through a filter(s)).

The functions of the connection processing subsystem include:
generating and updating a connection table;
generating and updating one or more tables to search for packets belonging to connections;
checking the received packets for correspondence (belonging) to established connections;
managing the connection state (creating, modifying, removing the state);
managing timeout values for connections.

The functions of the application layer protocol processing subsystem include:
searching packets for requests to establish additional connections;
registering new connections in the connections processing subsystem;
establishing relationships between child and parent connections within a group of connections.

The connection table contains a list of all established connections and associated information, including but not limited to:
information about packets belonging to a connection (an original packet, a reply packet, ICMP errors);
a network protocol type;
a connection state;
a timestamp of processing of the last packet;
information about transformations of a packet in the case of address translation;
information about groups of connections in the case of application layer protocols (FTP, SIP).

The packet lookup tables comprise an indexed list of packets that is optimized for faster search. The list of packets can be implemented in the form of a binary search tree, a hash table, or in a different way. Several packet lookup lists may be used simultaneously, each list processing individual packet types based on the type-specific information. For example, not only the packet header, but also the packet payload is to be analyzed to process ICMP error messages.

Packets received by the network interface unit are first checked for belonging to already established connections. If a packet belongs to an established connection, the connection processing subsystem performs all the necessary actions on the packet, and then the processing ends.

If no established connection is found, the packet is sent for testing to the packet filtering subsystem. The packet filtering subsystem checks the packet for compliance with the configured filters and modifies the packet according to the configured address translation rules. If the packet is blocked by any of the filters, the processing ends.

If the filtering subsystem allows the packet to be passed for further processing, the connection processing subsystem creates an entry about a new connection. When a new connection is created, information about all the packets passed within the connection is determined. The information on the packets belonging to the connection is stored in the lookup tables.

If the packet has been modified by the translation rules during the processing, this information is reflected in the connection information as follows. Before being modified, the packet is stored as an original packet, and a reply packet is generated based on the modified packet (by swapping the source and destination addresses and ports). In addition, the connection stores the information about transformation of the packet, with indication to packet fields that have been modified by the NAT rule (SourceIP, SourcePort, DestinationIP, DestinationPort). Based on the stored information, the following processing of the packet is performed within the connection:
- if a client-to-server packet is received and SourceIP/SourcePort flag is set in the packet transformation information, then the destination IP-address/port value from the reply packet is set in the packet as the source IP-address/port;
- if a server-to-client packet is received and SourceIP/SourcePort flag is set in the packet transformation information, then the source IP-address/port value from the original packet is set in the packet as the destination IP-address/port;
- if a client-to-server packet is received and DestinationIP/DestinationPort flag is set in the packet transformation information, then the source IP-address/port value from the reply packet is set in the packet as the destination IP-address/port;
- if a server-to-client packet is received and DestinationIP/DestinationPort flag is set in the packet transformation information, then the destination IP-address/port value from the original packet is set in the packet as the source IP-address/port.

Some application layer protocols, such as FTP and SIP, require grouping connections for their joint management. The grouping of connections is performed in the application layer protocol processing subsystem which analyzes the entire transmitted traffic within the specified protocols and searches packets for requests to establish additional connections. Upon detection of a request to establish an additional connection, the application layer protocols processing subsystem registers the new connection in the connection processing subsystem and marks it as a child connection, while the connection within which the command was received is marked as a parent connection.

While packets are being processed within the connections, information about the connection state is monitored. To manage the connection state, a set of flags listed in Table 1 is specified (in the byte defining the connection state).

TABLE 1

| Flag | Binary form | Description |
| --- | --- | --- |
| StateNew | 00000000b | New connection |
| StateSyn | 00000001b | First packet is sent from client |
| StateSynAck | 00000010b | First packet is sent from server |
| StateAck | 00000100b | Second packet is sent from client |
| StateEstablished | 00000111b | Connection is established |
| StateFinClient | 00001000b | FIN is sent on client's initiative |
| StateFinAckClient | 00010000b | Acknowledgement of FIN sent on client's initiative |
| StateFinServer | 00100000b | FIN is sent on server's initiative |
| StateFinAckServer | 01000000b | Acknowledgement of FIN sent on server's initiative |
| StateClosed | 01111000b | Connection is closed |

The connection state varies depending on the current state of the connection, the packet direction and the TCP flags (for TCP only). Analysis of the current connection state is performed by two types of operations: the comparison operator and verification of the set bits. The connection state is modified by setting appropriate bits.

When a new connection is created, its state is initialized by StateNew. Then the two-way exchange of packets between the node initiating the connection (client) and the node receiving the connection (server) is checked. If the check is completed successfully, the connection state is StateEstablished.

The check of the two-way exchange of packets for any protocol is implemented as follows:

The flag StateSyn is set in the connection state, if the following conditions are met:
- the current connection state is StateNew;
- the processed packet is sent from the client to the server;
- in the case of TCP, the TCP flag SYN is set in the packet header;

The flag StateSynAck is set in the connection state, if the following conditions are met:
- the current connection state is StateSyn;
- the processed packet is sent from the server to the client;
- in the case of TCP, the TCP flags SYN and ACK are set in the packet header;

The flag StateAck is set in the connection state, if the following conditions are met:
- the current connection state is StateSynAck;
- the processed packet is sent from the client to the server;
- in the case of TCP, the TCP flag ACK is set in the packet header.

For TCP, the connection state can be modified based on the TCP flags FIN and RST. The TCP connection termination processing is performed as follows:
- the flag StateClosed is set in the connection state, if the flag RST is set in the TCP-packet header;
- the flag StateFinClient is set in the connection state, if the following conditions are met:
  - the flag FIN is set in the TCP-packet header;
  - the processed packet is sent from the client to the server;
- The flag StateFinServer is set in the connection state, if the following conditions are met:
  - the flag FIN is set in the TCP-packet header;
  - the processed packet is sent from the server to the client;
- The flag StateFinAckClient is set in the connection state, if the following conditions are met:
  - the flag StateFinClient is set in the current connection state;
  - the flag ACK is set in the TCP-packet header;
  - the processed packet is sent from the server to the client;

The StateFinAckServer flag is set in the connection state, if the following conditions are met:
  the flag StateFinServer is set in the current connection state;
  the flag ACK is set in the TCP-packet header;
  the processed packet is sent from the client to the server.

If an ICMP error message (ICMP type 3, 4, 11, or 12) is received within the connection for any protocol, the flag StateClosed is set in the connection state.

When a packet is passed within the connection, the current time is set as the connection timestamp. For child connections belonging to a group of connections the parent connection timestamp is adjusted.

The connection processing subsystem periodically performs the procedure of clearing obsolete connections. In validation of connections, only parent connections in the group are taken into account. If the difference between the current time and the connection timestamp exceeds the waiting time for that type of connections, then such connection is removed (in the case of removal of a parent connection the entire group is removed).

The connection timeout depends on the current connection state and protocol and is calculated each time when the connection clearing procedure is performed:
  if the flag StateEstablished is not set in the connection state or StateClosed flag is set, the value TimeoutNewOrClosed is set as the connection timeout;
  if the previous condition is not met, the connection timeout is set depending on the protocol (TimeoutTcp, TimeoutUdp, TimeoutIpOther).

Depending on the total number of connections that are currently established in the firewall, the connection processing subsystem may adjust the specified timeout values. Since the connection timeouts are calculated dynamically based on the specified constants, then modification of those constants affects timeouts of all connections (both the new and the already established ones). The maximum value (which has been set initially), the minimum value, and the modification step size is stored for each type of timeout (TimeoutNewOrClosed, TimeoutTcp, TimeoutUdp, TimeoutIpOther), in addition to its current value.

If the number of established connections exceeds the predetermined threshold (UpperThreshold), timeouts of all connections are decremented by the respective modification step size, and the resultant value should not be less than the minimum one. After the load has reduced to the lower threshold (LowerThreshold), the current timeout values are incremented by the modification step size, but the result should not exceed the maximum timeout value for such type of connections. Thus, by using the mechanism of dynamically modifying timeouts the firewall can flexibly manage throughput responsive to the current load.

The size of the connection table, the threshold values, timeouts for different types of connections, and the clearing period may vary depending on hardware characteristics and the kind of transmitted traffic.

The following ratios may be recommended for the threshold values:
  UpperThreshold=0.8 * MaxConnection,
  LowerThreshold=0.5 * MaxConnection.

The maximum size of the connection table (MaxConnection) is determined based on the amount of memory available in the firewall and the amount of memory occupied by a single connection (depends on implementation of the firewall).

Selection of timeout values should rely on the general rule that the timeout of TCP connections is a multiple of the timeout of UDP or IP connections which, in turn, is an order of magnitude higher than the timeout for new and closed connections. The connection clearing period is recommended to be an order of magnitude less than the timeout of new and closed connections.

Based on the practical implementations, the following maximum timeout values (in seconds) may be recommended:
  TimeoutTcp=1800
  TimeoutUdp=TimeoutIpOther=300
  TimeoutNewOrClosed=5
  TimeoutCleanup=0.5.

The modification step size and the minimum timeout values are preferably defined at the level of 20% of the maximum timeout value.

Let us consider how the usage of the dynamic timeout mechanism and the connection state monitoring enables to improve resistance of the firewall against DoS/DDoS-attacks. Typically, DoS/DDoS-attacks are characterized by a large number of connection requests sent from different IP-addresses. Thus, the firewall load dramatically increases, while most connections are new (i.e. the flag StateEstablished is not set in them). Since the timeout value for the new connections (TimeoutNewOrClosed) is much less than for the established connections, these connections will be cleared first of all, not affecting the established connections.

Obsolete connections are cleared in the firewall periodically, rather than at packet processing, therefore, the processor resources consumed for removal of obsolete connections will be constant and independent of the firewall load. Upon reaching the maximum allowable number of connections, the firewall will be forced to block all new connection requests until the next clearing cycle. But even in this case, the excessive number of connections will affect only the new connections, while the already established connections will not be influenced anyhow. As a result, the method according to the present disclosure exhibits high resistance against denial-of-service attacks.

All the above procedures and algorithms can be implemented by a person skilled in the art based on the commonly available knowledge about possible implementations of the required functions to be performed. It should be noted that other embodiments of the method are possible that are different from the ones described above and depend on personal preferences in programming individual actions and functions.

The invention claimed is:

1. A method for managing connections in a firewall, the method comprising the steps of:
  receiving packets from an external network;
  generating a connection table containing the following information:
    information about packets included by a connection (an original packet, a reply packet, ICMP errors);
    information about transformations of a packet in the case of address translation;
    a network protocol type;
    a connection state (new, established, closed);
    a timestamp of processing of the last packet;
    information about groups of connections in the case of application layer protocols (FTP, SIP);
  determining the total number of currently established connections;
  determining a level of firewall load by comparing the number of established connections with a predetermined threshold;
  identifying new and established connections based on two-way exchange of packets between a client and a server;

identifying closed connections based on processing ICMP error messages or flags in a TCP header (for TCP only);

dynamically determining current timeout values for connections from the following parameters:
  the network protocol type;
  the connection state;
  the firewall load level;

modifying the last packet processing timestamp, if any packet is passed within a given connection or a group of connections;

removing the connection, if the last packet processing timestamp differs from the current time by a value greater than the timeout determined for said connection.

* * * * *